`3,761,250`
PRODUCTION OF NICKEL POWDER FROM BASIC NICKEL CARBONATE
Donald Robert Weir, Fort Saskatchewan, Alberta, and Willie Seibt, Edmonton, Alberta, Canada, assignors to Sherritt Gordon Mines Limited, Toronto, Ontario, Canada
Filed July 2, 1971, Ser. No. 159,189
Int. Cl. C22b *23/04*
U.S. Cl. 75—108      10 Claims

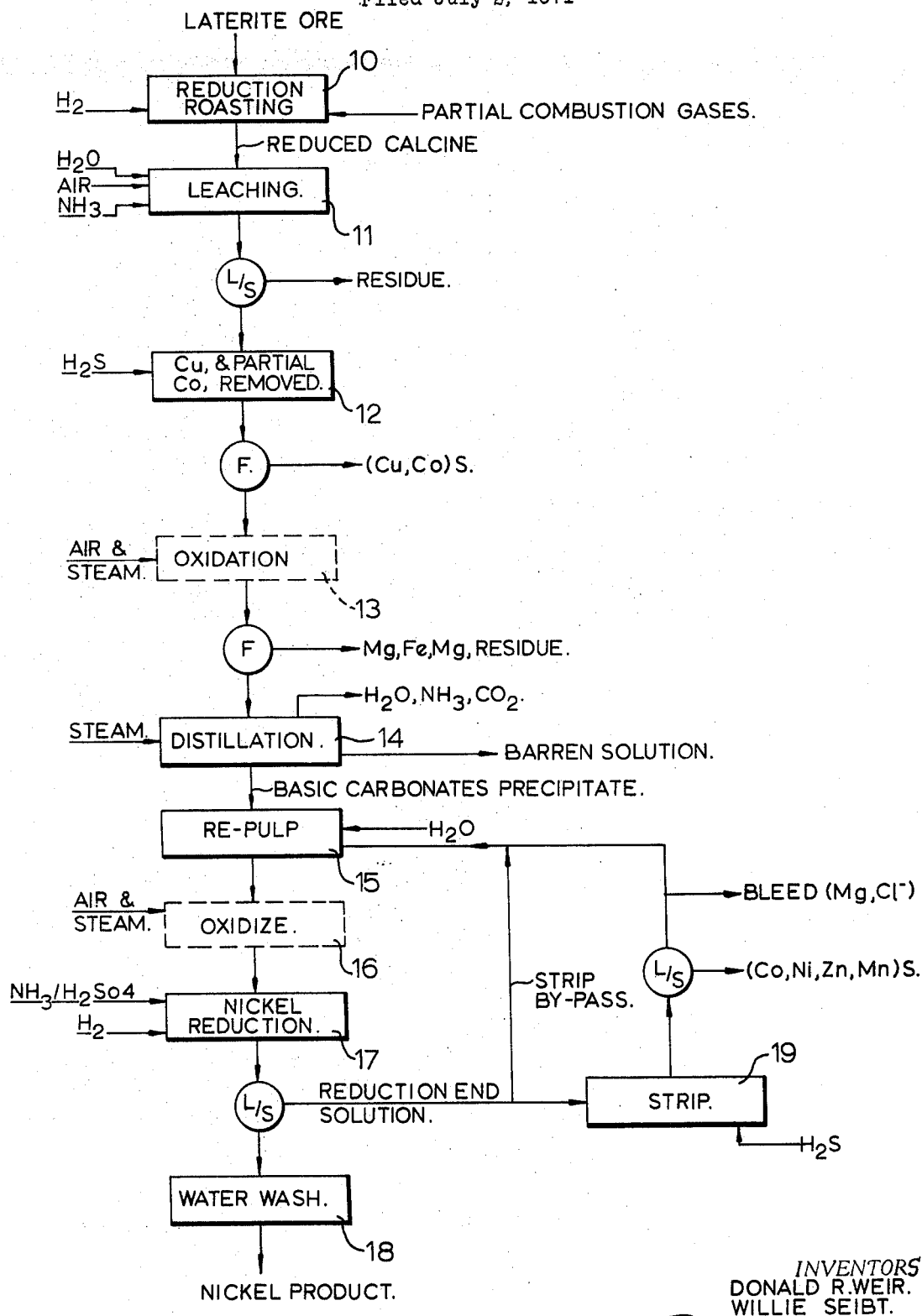

ABSTRACT OF THE DISCLOSURE

Substantially pure nickel powder is produced from nickel and cobalt bearing aqueous ammoniacal ammonium carbonate liquor containing copper and other undesirable impurities such as zinc, magnesium and manganese by first treating the liquor to remove only sufficient cobalt to produce a nickel to cobalt molar ratio in the solution between about 100 and 200. The solution is then boiled to precipitate the nickel and residual cobalt as basic carbonates. The basic carbonates percipitate is slurried in aqueous media and is reacted with hydrogen at elevated temperature and pressure under conditions which are controlled to ensure that the pH at the end of the reduction reaction is between about 2 and about 3. Control of pH in this range avoids contamination of the nickel powder by the impurities. Specifically, pH is controlled by adjustment of the relative sulphate ion and ammonia content of the reduction feed slurry.

---

This invention relates to a method for recovering substantially pure nickel from nickel bearing aqueous ammonium carbonate liquors containing cobalt as well as sulphur and metal impurities such as zinc, magnesium, manganese, iron and copper. More particularly, it relates to an improved direct aqueous reduction process whereby the proportion of metallic nickel recovered from such liquors is substantially increased and the major portion of the cobalt is separately recovered as a sulphide concentrate containing a minimum quantity of nickel.

Nickel and cobalt bearing oxidic ores, such as the lateritic and garnieritic ores of Cuba, New Caledonia, Indonesia and the Philippines, for example, constitute the world's largest known reserves of nickel and cobalt. Processes are known and in use for the recovery of nickel and cobalt from such ores, but they are subject to economic and metallurgical problems due to the complex nature of the ores, the relatively low nickel and cobalt contents and the necessity of treating very large tonnages to obtain a commercially practical rate of production of nickel therefrom.

One well known process employed for the treatment of lateritic ore, known as the Nicaro process, involves roasting the ore under reducing conditions to reduce the nickel oxide of the material to crude metallic state. The reduced ore is then leached under oxidizing conditions with an aqueous ammoniacal ammonium carbonate solution to extract the metallic nickel and dissolve it in the leach solution as nickel ammine carbonate. Undissolved residue is separated from the leach solution and the clarified solution is heated to drive off ammonia and carbon dioxide and to precipitate the dissolved nickel as basic nickel carbonate. Precipitated basic nickel carbonate is separated from the solution and is decomposed by heating to form nickel oxide which may be marketed as such or reduced to metallic nickel for sale or for use in that form.

A number of economic and metallurgical problems are encountered in the practice of this process. For example, cobalt associated with the nickel in lateritic and garnieritic ores tends to be reduced and subsequently dissolved in the ammonium carbonate leach solution together with the nickel and to subsequently precipitate with and contaminate the basic nickel carbonate. Also, impurities such as zinc, manganese, magnesium, copper and silica are dissolved in the leach solution and precipitate with the nickel carbonate. Since these impurities are not removed during the basic nickel carbonate decomposition and the nickel oxide reduction steps, they also contaminate the final nickel products.

In an effort to overcome these problems, procedures have been developed and used by which the leaching and basic nickel carbonate precipitation steps are conducted specifically to minimize the dissolution and precipitation of cobalt and other soluble carbonate forming impurities; however, such procedures have the disadvantage of causing a loss of desired nickel values in the leaching and basic nickel carbonate precipitation steps as well, of course, as the loss of a substantial portion of the cobalt content of the ore treated. These problems and disadvantages have been overcome to some extent by more recently developed processes, such as that described in Canadian Pat. No. 854,116, for example. According to this process, cobalt and copper are substantially completely removed from the leach liquor prior to the basic nickel carbonate precipitation step by reacting it with a sulphidizing agent to precipitate cobalt and copper as sulphides. The cobalt and copper-free solution is then boiled to precipitate the dissolved nickel as basic nickel carbonate, the precipitate is separated from the barren liquor and is then re-dissolved in aqueous ammoniacal ammonium carbonate solution. Undissolved residue from this re-dissolution operation, which contains the bulk of the impurities such as magnesium, manganese, aluminum and silica, is separated from the solution, the ammonia and carbon dioxide contents are adjusted and the solution is then reacted with hydrogen at elevated temperature and pressure to reduce the nickel and precipitate it in elemental powder form. Whereas this process has a number of advantages over the conventional Nicaro process, it is nonetheless subject to problems which militate against its adoption for large scale commercial operations. Firstly, the cobalt-copper removal operation is technically difficult to carry out and results in the removal of a substantial amount of nickel from the liquor along with the copper and cobalt. For example, although Pat. No. 854,116 refers to increasing the nickel to cobalt molar ratio in the leach solution to above about 1000 by precipitation of a mixed cobalt-nickel sulphide containing less than 1.5 moles of nickel per mole of cobalt, in actual practice it is extremely difficult to obtain such nickel to cobalt ratios in solution without precipitating at least 3 to 4 moles of nickel along with the cobalt. As a result, a substantial portion of the nickel in the leach liquor is recovered as a relatively low value mixed nickel-cobalt sulphide precipitate rather than being recovered as elemental nickel in the subsequent reduction step of the process. A second serious problem is that it is difficult to re-dissolve the basic nickel carbonate precipitate without employing at least two dissolution stages and this, of course, increases the equipment requirements and capital costs for the process considerably. Still another problem is that some metal impurities, and zinc in particular, are only partly eliminated in the re-dissolution operation with the result that they end up contaminating the nickel product.

These and other problems of the prior processes are largely overcome by the process of the present invention. According to the invention, nickel and cobalt bearing aqueous ammoniacal ammonium carbonate liquor which also contains undesirable metal impurities including zinc, magnesium, manganese, iron and copper is first treated to selectively remove sufficient cobalt as a sulphide precipitate to produce a nickel to cobalt molar ratio in the liquor in the range of about 100:1 to 200:1. Such treatment also results in virtually quantitative precipitation of copper as copper sulphide. After separation of the cobalt and copper sulphide precipitates, the solution is heated to drive off ammonia and carbon dioxide and precipitate substantially all the dissolved nickel from the liquor as basic nickel carbonate. An aqueous slurry of the basic nickel carbonates is prepared and reacted with hydrogen at elevated temperature and pressure to reduce the contained nickel to elemental particulate form and to produce a reduction end solution having a dissolved nickel to cobalt molar ratio between about 1:1 and about 0.5:1. The slurry treated in the reduction step is adjusted to contain about 40 to about 150 g.p.l. of nickel and sulphate ions and ammonia in amounts such that there is a sufficient excess of sulphate ions over the amount required to combine stoichiometrically with the ammonia and soluble sulphate-forming metal impurities in the slurry to produce a pH between about 2 and about 3.0 in the reduction end solution. Nickel powder product substantially free from cobalt and other undesirable impurities is recovered from the reduction end solution.

According to a particularly useful modification of the invention, a plurality of reduction cycles are conducted on a sequential, batch basis with at least a portion of the reduction end solution from each reduction cycle being recycled for use in making up reduction feed slurry for each subsequent reduction cycle.

According to another useful modification of the invention, where the ammonium carbonate liquor which is to be treated for nickel recovery contains sulphur in a form other than sulphate form, this sulphur is converted to sulphate form in an oxidation operation which may be conducted either on the leach liquor prior to the basic nickel carbonate precipitation step or on the reduction feed slurry.

The process effectively permits recovery of all but a very small portion of the nickel from nickel and cobalt containing ammonium carbonate liquors as a high purity elemental nickel powder. Cobalt is recovered as a sulphide concentrate containing less than 1 mole of nickel per mole of cobalt. Recovery of nickel in elemental form is maximized through close control in two of the basic operations of the process. Firstly, in the cobalt removal operation, only sufficient cobalt is removed from the liquor to increase the nickel to cobalt molar ratio to between 100:1 and about 200:1; as a result, co-precipitation of nickel with the cobalt is substantially completely avoided. Secondly, although the resulting solution still contains a relatively high proportion of cobalt compared with the prior art solution in which the Ni:Co molar ratios greater than 1000 are required, this is compensated for by (a) controlling the reduction end solution pH in the subsequent reduction operation between about 2 and about 3 by adjustment of the relative sulphate and ammonia contents of the reduction slurry and (b) terminating the reducing reaction when the nickel to cobalt ratio in the reduction end solution is within the range of about 1:1 to about 0.5:1. Another important feature of the invention is that contamination of the nickel powder product by impurities such as zinc, manganese, magnesium, aluminum and silica is avoided without the complicated re-dissolution operation of the prior art. By controlling the reduction end solution pH below about 3.0, substantially all such impurities are dissolved in the reduction end solution as soluble sulphates and thereby are substantially completely separated from the nickel powder product with the reduction end solution and with simple water washing of the powder.

Although the method of the present invention is applicable to any ammoniacal ammonium carbonate liquors containing nickel, cobalt and undesirable contaminants including particularly zinc, copper, magnesium and manganese, the process will normally be used in conjunction with a reduction-ammonium carbonate leach process for recovering nickel from nickeliferous laterites. Accordingly, it is described in further detail hereinbelow with reference to the accompanying drawing which illustrates the process as so used. According to the process as illustrated, laterite ore which has been dried, sized and/or ground as required is fed to a reduction roasting step 10 wherein it is reacted under controlled conditions with reductants such as partial combustion gases and hydrogen to reduce the nickel and cobalt oxides to a crude metallic form with a minimum accompanying reduction of iron oxide to metallic form.

The calcined ore is passed to a leaching operation 11 where it is leached with aqueous ammoniacal ammonium carbonate solution under oxidizing conditions to extract nickel and cobalt. Leaching is conducted at ambient temperatures in the presence of free oxygen which is provided, preferably, by sparging air into the leach vessel. Leaching preferably is continued to obtain optimum dissolution of nickel and cobalt regardless of the amount of carbonate forming impurities such as zinc, manganese and magnesium which may be dissolved in the leach solution. Because of the relatively low nickel content of the reduced ore and the practical necessity of conducting the leaching operation with a pulp density within a range, usually 20–30% by weight solids, that permits efficient leaching, leach solution generally is recycled as required to build up the nickel content to 8–15 grams per litre of which level the solution can be economically processed further for the recovery of nickel. According to the invention, the leach solution, after separation from leach residue by conventional means such as thickening and filtration, is treated in cobalt and copper removal step 12 to remove sufficient cobalt therefrom to increase the nickel to cobalt ratio up to about 200:1 and preferably between about 100:1 and 200:1. This may be accomplished by the addition of finely divided nickel sulphide or more preferably by reacting the solution with a sulphidizing agent such as $H_2S$, $(NH_4)_2S$ or NaHS. In any case, it is essential that this removal operation be conducted so as to precipitate only sufficient cobalt to produce in the liquor a nickel to cobalt molar ratio up to about 200:1. So long as the operation is conducted in this way, co-precipitation of nickel with the cobalt is substantially avoided, the cobalt is recovered as a very high grade cobalt sulphide and essentially no nickel is removed from the solution with the cobalt.

The product liquor from the cobalt and copper removal operation 12 therefore is an ammoniacal nickel ammonium carbonate solution containing about 8 to about 15 grams per litre of nickel and preferably having a nickel to cobalt molar ratio within the range of about 100:1 to 200:1. The solution also will contain sulphur and other impurities such as zinc, magnesium, manganese and iron. This liquor may optionally be treated at this point in oxidation operation 13 to convert all sulphur in the solution to sulphate form. In this operation, the solution is contacted with a free oxygen bearing, oxidizing gas, such as air, at a temperature within the range of about 65° C. to about 175° C. until substantially all sulphur compounds in the liquor are converted to sulphate form, usually about 5–15 minutes. The bulk of the manganese, magnesium and iron contaminants in the liquor are precipitated as hydroxides and carbonates during this operation and are separated from the solution by conventional liquid-solids separation procedures.

The liquor is next treated in a distillation step 14 to remove ammonia and carbon dioxide to precipitate substantially all the dissolved nickel and the remaining cobalt as basic carbonates. In this operation, a large part of the sulphur and the other impurities in solution precipitate with the basic nickel carbonate. If the liquor has been treated in oxidation step 13 as described above, all sulphur will be in sulphate form and it will precipitate in combination with nickel as a basic nickel sulphate compound. If the solution has not been subjected to oxidation treatment, non-sulphate sulphur, such as that in the form of unsaturated sulphur compounds, such as thiosulphates and polythionates, is adsorbed to a large extent by the basic cobalt carbonates precipitate and therefore is also precipitated.

For the subsequent steps of the process, a relatively concentrated aqueous slurry of the basic carbonate precipitate is prepared. This may be done simply be decanting sufficient of the barren solution from the basic carbonates distillation operation 14 to provide a slurry of the desired concentration. Preferably, however, the basic carbonates precipitate is separated from the barren solution by conventional thickening and filtration procedures and the wet filter cake is re-pulped, as indicated by the numeral 15 on the drawing, with water and/or with recycled reduction end solution. In any case, the proportion of basic carbonates to re-pulp liquid preferably is adjusted to yield a slurry containing from about 40 to about 150 grams per litre of nickel. These limits are not critical to the operativeness of the process but represent the desirable range from a practical operating and economic point of view. The optimum nickel concentration for the reduction feed slurry in most cases is about 80–100 grams per litre. If the slurry contains sulphur in a form other than sulphate, that is if all sulphur values have not been oxidized to sulphate form during the previous processing history of the basic nickel carbonate, then preferably the slurry is treated in a high temperature oxidation step 16 to ensure conversion of the sulphur values to sulphate form. If this is not done, the nickel powder product from the direct reduction operation may be contaminated with insoluble sulphide sulphur compounds which are difficult to remove by post-treatment of the product. In the sulphur oxidation operation 16, the slurry of basic carbonates is charged into a pressure vessel, such as an autoclave, and is heated to a temperature within the range of about 65° C. to about 260° C., preferably about 175° C. to about 230° C. The slurry is actively agitated and an oxygen bearing, oxidizing gas, such as air, oxygen or oxygen-enriched air is fed into the slurry at a rate sufficient to maintain a partial pressure of oxygen above about 5 p.s.i., preferably between about 20–50 p.s.i. This operation is continued until substantially all sulphur values in the system are oxidized to sulphate form, generally a period of about 5 to 10 minutes. The oxidized slurry is then passed to the nickel reduction operation 17.

In carrying out the nickel reduction operation of the present invention, the slurry is charged into an agitator-equipped pressure vessel, such as an autoclave and is reacted with hydrogen to reduce the nickel in the slurry to elemental particulate form. The reducing reaction is carried out at a temperature within the range of about 80° C. to about 350° C., preferably about 150° C. to 250° C., under a partial pressure of hydrogen within the range of from about 100 to 500 p.s.i., preferably about 300–350 p.s.i. The reducing reaction is self-nucleating; that is, no seed or catalyst is required to initiate or promote the direct reduction of nickel in the slurry to elemental nickel. Additives may be provided in the reduction system for purposes of controlling the physical properties of the powder product. For example, a polyacrylic acid compound such as that sold by Rohm & Haas Company under the trade name Acrysol and/or a low molecular weight ethylene maleic anhydride compound, such as that sold by Monsanto Company under the trade name EMA11 may be added in amounts up to about 0.5 g.p.l. if desired to produce irregular-shaped nickel powder particles having good compacting properties.

Up to this point, the conditions for the reduction operation are generally in accordance with those employed in the prior art for precipitating nickel from nickel ammine carbonate solutions. However, according to the invention, the reduction conditions are further controlled in two important respects to maximize recovery of a particulate metallic nickel product in which the impurities' levels are well within commercial specifications. Firstly, the reduction reaction is continued only until the ratio of nickel to cobalt in the reduction charge is between about 1:1 and 0.5:1. Secondly, the hydrogen ion content of the reduction charge is controlled such that the pH of the liquid phase of the reduction charge is within the range of about 2–3 at the completion of the reduction cycle, that is, when the required nickel to cobalt ratio is reached. The first requirement is met simply by terminating the reduction reaction when the nickel to cobalt ratio reaches the desired level. The second requirement is met by adjusting the sulphate ion and ammonia contents of the reduction charge such that there is an excess of sulphate ions over the stoichiometric amount required to combine as soluble sulphates with the ammonia and soluble sulphate forming metal impurities such as zinc and magnesium in the charge. The sulphate ions in excess of those needed to supply the stoichiometric requirements of the ammonia and sulphate forming impurity metals in the reduction feed slurry will be present as basic nickel sulphate and such sulphate ions are released during the reduction operation as a result of the reaction of the basic nickel sulphate with hydrogen to form elemental nickel and sulphuric acid. Thus, reduction feed slurry must contain a sufficient quantity of sulphate ions to provide the acid required to ensure that the pH of the reduction end solution is below 3. In most cases, a basic nickel-cobalt carbonates precipitate derived from leaching reduction roasted laterite ores will inherently contain sulphur in excess of this quantity and, with such excess of sulphate ions in the reduction feed slurry, the equilibrium pH of the reduction end solution will be below about 2. Accordingly, in this case, it is necessary to provide sufficient ammonia in the system to neutralize excess acid so as to control the pH within the desired range of 2–3. The precise amount of ammonia provided in any case will, of course, depend on the sulphate ion content of the reduction feed slurry. In most cases, an ammonia addition between about 1 and about 3 g.p.l. will be required. Where the processing history of the basic carbonates precipitate is such that there is a deficiency of sulphate ions under that which would produce a pH below 3, the deficiency is made up by providing sulphate ions in the reduction feed system by addition of sulphuric acid or nickel sulphate.

Upon completion of a reduction operation, the reduction end solution is discharged. The nickel powder product may be recovered after each such reduction but preferably a plurality of reductions or "densifications" are effected before removal of the nickel powder product from the reduction vessel. That is, reduction end solution is discharged from the autoclave after each reduction and fresh feed slurry, adjusted with respect to sulphate ions and ammonia as required, is added to effect a series of reductions, e.g. up to 50 or more densifications, with the powder product of each reduction functioning as a core for each subsequent reduction. Regardless of the number of reductions conducted, the reduction end products consist of nickel powder and reduction end solution containing dissolved metal impurities and between about 0.5 and about 1 mole of nickel per mole of cobalt.

The nickel powder product is physically separated from the reduction end solution and washed, as indicated at 18 on the drawing, and dried. The reduction end solution may be discarded with or without first being treated, such as by reaction with $H_2S$, to remove the residual nickel and cobalt. Preferably, however, at least a portion of the reduction end solution is recycled and used to make up the feed slurry for each succeeding reduction. That is, for the initial reduction operation, the basic carbonates precipitated from distillation step 14 are simply slurried in water or weak ammonium carbonate solution, the slurry is oxidized if it contains sulphur in non-sulphate form, the required adjustment of ammonia and sulphate ion contents is made as previously described and the system is then reacted with hydrogen to reduce the basic nickel carbonate to elemental nickel powder. This powder remains in the reduction vessel and the reduction end solution is separated form the nickel powder by decanting. At least a part of the decanted solution is then recycled to repulp step 15 to prepared the next charge. The new charge is then oxidized, if necessary, adjusted to provide the required sulphate ion and ammonia contents and reacted with hydrogen as in the preceding reduction. This procedure is repeated for the desired number of reductions or "densifications" with at least a part of the reduction in solution from each preceding reduction being used to make up the feed slurry for each subsequent reduction. When a densification series or cycle has been completed, in most cases after about fifty reductions, the powder product is discharged and another densification series is commenced.

In recycling reduction end solution during the densification series, the ammonium sulphate concentration will increase with each successive reduction as a result of the combination of $SO_4$ ions with ammonia added to control the pH until an ammonium sulphate equilibrium level is reached. This level will depend on the amount of sulphate sulphur in the reduction feed slurry, the nickel concentration of the feed slurry and the proportion of reduction end solution recycled. In most cases, equilibrium will be reached with an ammonium sulphate concentration in the reduction feed within the range of about 40 to 60 g.p.l. The concentration of soluble sulphate forming metal impurities, such as zinc and magnesium, will also build up in the system to an equilibrium level. As shown in 19 in the drawing, in the operation of the invention, it is preferred to treat at least a portion of the reduction end solution with $H_2S$ to strip the residual nickel and cobalt values therefrom as a high grade nickel-cobalt sulphide concentrate having a nickel to cobalt ratio in the range of about 1:1 to about 0.5:1. Other metals in the solution, such as zinc and manganese, which react with sulphide ions under acidic conditions will also be removed along with the nickel and cobalt. Also, normally it will be necessary to bleed a portion of the reduction end solution in order to control the build up of soluble impurities such as Mg and $Cl^-$ and, also, to compensate for the liquid coming into the system with the basic carbonates feed.

The process of the invention is further illustrated by the following examples:

EXAMPLE I

A nickel bearing aqueous ammoniacal ammonium carbonate leach solution derived from leaching reduced nickeliferous laterite ore and containing 9.20 g.p.l. of nickel and 0.438 g.p.l. of cobalt was reacted with ammonium sulphide to precipitate sufficient cobalt to increase the nickel to cobalt molar ratio in the solution to about 170:1. This solution, after separation of the cobalt precipitate was steam boiled to precipitate substantially all the dissolved nickel and residual cobalt. The precipitate, after separation from the barren solution and washing with hot water analyzed (wt. percent): Ni—49.34; CO—0.29; S(Total)—1.27; $NH_3$(Total)—0.07; $CO_2$—9.86; Mg—0.092; Mn—0.02; Zn—0.036; moisture 55.0. A series of three reductions was carried out using this precipitate. In each case, about 200 grams of the precipitate were slurried with water and charged into a 1 gallon high pressure laboratory autoclave equipped with an agitator. The slurry was oxidized at 350° F. under 20 p.s.i. oxygen for 30 minutes and then reacted with hydrogen at a partial pressure of 350 p.s.i. and at a temperature of 350° F. In test 1, no ammonia was added to the charge; in test 2, 1 g.p.l. $NH_3$ was added and in test 3, 2 g.p.l. $NH_3$ was added. Details of the reduction results are shown in Table I.

TABLE I

| | Test Number | | |
|---|---|---|---|
| | 1 | 2 | 3 |
| $NH_3$ added, g.p.l. | 0 | 1 | 2 |
| Nickel powder, gms. | 105.7 | 92.3 | 101.5 |
| Ni powder analysis after water wash: | | | |
| Ni+Co, percent | 99.90 | 99.98 | 99.94 |
| Co, percent | 0.052 | 0.041 | 0.40 |
| $S_T$, percent | 0.010 | 0.0083 | 0.0061 |
| Mg, percent | 0.0013 | 0.0012 | 0.0013 |
| Mn, percent | <0.001 | <0.001 | 0.0012 |
| Zn, percent | 0.0022 | 0.0010 | 0.012 |
| $H_2$ loss, percent | 0.38 | 0.42 | 0.32 |
| Reduction end solution, mls | 1,900 | 1,910 | 1,830 |
| Reduction end solution analysis: | | | |
| pH | 2.0 | 2.8 | 6.8 |
| Ni (g.p.l.) | 1.32 | 0.095 | 0.23 |
| Co (g.p.l.) | 0.34 | 0.30 | 0.017 |

From the results shown in Table I, it can be observed that in test 1, although co-precipitation of cobalt with the nickel powder was minimal (0.052), the reduction end solution still contained a relatively high nickel concentration (1.32 g.p.l.). In test 2, with the addition of sufficient $NH_3$ to maintain the reduction end solution pH at 2.8, substantially complete nickel reduction was obtained with even less co-precipitation of cobalt (0.041%) than in test 1. In test 3, where the $NH_3$ addition was sufficient to produce a reduction end solution pH of 6.8, although relatively complete nickel reduction was obtained, the product was badly contaminated with co-precipitated cobalt and also with zinc.

EXAMPLE 2

In this example, the procedure of test 2 of Example 1 was followed except that the nickel to cobalt ratio of basic nickel carbonate used to prepare the reduction feed slurry was 85:1 rather than 170:1. The reduction results are shown in Table II.

TABLE II

| | |
|---|---|
| $NH_3$ added, g.p.l. | |
| Ni powder, gms. | 107.5 |
| Ni powder analysis after water wash: | |
| Ni+Co percent | 99.11 |
| Co, percent | 0.24 |
| $S_T$, percent | 0.013 |
| Reduction end solution, mls | 1,830 |
| Reduction end solution analysis: | |
| pH | 2.5 |
| Ni, percent | 0.20 |
| Co, percent | 0.56 |
| $S_T$, percent | 2.02 |
| $NH_3$ total, percent | 1.6 |
| $CO_2$, percent | 0.025 |

From the results in Table II, it can be observed that with the lower nickel to cobalt ratio in the feed slurry although relatively complete reduction of nickel was obtained, it was contaminated by 0.24% co-precipitated cobalt.

EXAMPLE 3

In this example, ammoniacal ammonium carbonate leach solution derived from leaching reduced laterite ore was reacted with $(NH_4)_2S$ to remove sufficient cobalt to produce a nickel to cobalt molar ratio in the solution of about 150:1. This solution was then oxidized by contacting it with air for 5 minutes at a temperature of 150° C. at 420 p.s.i., total pressure. The oxidized solution was filtered and batch boiled to yield basic nickel carbonate which analyzed (wt. percent): Ni—53.3; Co—0.36; Cu—0.005; Fe—0.023; $S_{Total}$—0.44; Mg—0.106; Mn—0.0044; Zn—0.085; $NH_3$(Total)—1.7; $CO_2$—5.55; $H_2O$—73.1. A sample of this basic nickel carbonate was re-pulped in a solution containing 40 g.p.l. of ammonium sulphate to provide a slurry containing about 90 g.p.l. nickel. Two litres of this slurry were charged into a 4.5 litre high pressure agitator equipped autoclave together with 10 g.p.l. of $H_2SO_4$. The charge was reacted with hydrogen at 175° C. under 350 p.s.i. $H_2$ overpressure until the reduction was complete. Ten ml. of 2.5% Acrysol A-3 was added to each litre charge to control the particle size of the precipitated nickel powder. At the completion of the reduction operation, reduction end solution was discharged from the autoclave, stripped of cobalt with $H_2S$ to assure less than about 1.0 g.p.l. cobalt in subsequent reduction end solutions, and was used to re-pulp a second batch of the basic nickel carbonate to again provide a feed slurry containing about 90 g.p.l. of nickel. This charge was then reduced with hydrogen in the same manner as just described for the first reduction. This procedure was repeated for a total of 8 reductions or "densifications" with the amount of added $H_2SO_4$ being progressively decreased. Reduction end solution and nickel powder from each densification cycle were analyzed and the results, together with the amounts of $H_2SO_4$ added are shown in Table III. It will be noted that the amount of nickel not reduced is a function of the stoichiometric excess of total sulphur over $NH_3$ in the reduction end solution. As the excess of total sulphur over $NH_3$ is decreased (by adding less $H_2SO_4$), the pH tends to increase, the unreduced nickel decreased but the amount of cobalt reduced is virtually unaffected.

TABLE III

| Densification | 1 | 2 | 3 | 4 | 5 | 6 | 7 | 8 |
|---|---|---|---|---|---|---|---|---|
| G.p.l. $H_2SO_4$ added | 10 | 7 | 7 | 7 | 5 | 3 | 3 | ---- |
| Ni+Co+Cu, percent | 99.8 | 99.75 | 99.75 | 99.69 | 99.76 | 99.45 | 99.43 | 99.48 |
| Co, percent | 0.011 | 0.011 | 0.012 | 0.013 | 0.015 | 0.017 | 0.019 | 0.021 |
| Cu, percent | 0.0078 | 0.0079 | 0.0080 | 0.0030 | 0.0078 | 0.0078 | 0.0072 | 0.0072 |
| Fe, percent | 0.0040 | 0.0029 | 0.0026 | 0.0025 | 0.0025 | 0.0032 | 0.0020 | 0.0017 |
| Mn, percent | 0.0003 | 0.0002 | 0.0002 | 0.0002 | 0.0002 | 0.0002 | 0.0002 | 0.0002 |
| Mg, percent | 0.0030 | 0.0017 | 0.0012 | 0.0017 | 0.0013 | 0.0022 | 0.0014 | 0.0014 |
| Zn, percent | 0.0016 | 0.0018 | 0.0019 | 0.0022 | 0.0021 | 0.0027 | 0.0027 | 0.0032 |
| Al, percent | 0.0050 | 0.0063 | 0.0050 | 0.0050 | 0.0025 | 0.0025 | 0.0038 | 0.0025 |
| $SiO_2$, percent | 0.0011 | 0.0009 | 0.0015 | 0.0024 | 0.0024 | 0.0023 | 0.0017 | 0.0012 |
| $S_T$, percent | 0.0118 | 0.0157 | 0.0159 | 0.0176 | 0.0158 | 0.0177 | 0.0178 | 0.0167 |
| C, percent | 0.052 | 0.067 | 0.057 | 0.067 | 0.050 | 0.076 | 0.057 | 0.065 |
| $O_2$, percent | 0.205 | 0.263 | 0.253 | 0.279 | 0.257 | 0.324 | 0.272 | 0.275 |
| pH | 2.0 | 2.3 | 2.3 | 2.1 | 2.1 | 2.3 | 2.3 | 2.5 |
| Ni, percent | 2.86 | 5.05 | 5.81 | 5.80 | 5.51 | 3.68 | 2.67 | 0.976 |
| Co, percent | 0.605 | 0.961 | 0.988 | 0.904 | 0.911 | 0.914 | 0.963 | 1.060 |
| Fe, percent | 0.045 | 0.067 | 0.080 | 0.088 | 0.091 | 0.093 | 0.095 | 0.081 |
| Mn, percent | 0.0086 | 0.013 | 0.015 | 0.017 | 0.017 | 0.018 | 0.018 | 0.015 |
| Mg, percent | 0.198 | 0.304 | 0.375 | 0.407 | 0.415 | 0.458 | 0.473 | 0.374 |
| Zn, percent | 0.138 | 0.224 | 0.276 | 0.302 | 0.312 | 0.322 | 0.326 | 0.266 |
| ST, percent | 15.13 | 15.68 | 15.51 | 15.61 | 14.78 | 13.50 | 12.81 | 8.88 |
| $NH_{3T}$, percent | 11.8 | 10.3 | 9.25 | 8.70 | 8.20 | 7.90 | 7.80 | 6.25 |

What we claim as new and desire to protect by Letters Patent of the United States is:

1. In the process for recovering nickel from nickel and cobalt bearing aqueous ammoniacal ammonium carbonate liquor containing sulphur and other impurities including copper and at least one of zinc, magnesium and manganese, the improved method for recovering nickel in elemental powder form substantially free from said impurities which comprises the steps of treating said liquor with a sulphidizing agent to precipitate sufficient cobalt therefrom to produce a nickel to cobalt molar ratio in said liquor up to about 200:1; separating the precipitated cobalt and heating the resulting liquor to drive off ammonia and carbon dioxide and precipitate substantially all dissolved nickel and the residual cobalt from the liquor as basic carbonates; forming an aqueous reduction feed slurry with said basic carbonates precipitate and reacting said slurry with hydrogen at elevated temperature and pressure to reduce contained nickel carbonate and produce elemental nickel powder and a reduction end solution having a dissolved nickel to cobalt molar ratio between about 1:1 and about 0.5:1; adjusting and correlating the sulphate ion and ammonia contents of said reduction feed slurry such that it contains a sufficient excess of sulphate ions over the amount required to combine stoichiometrically with the ammonia and soluble sulphate forming metal impurities in the slurry to produce a pH between about 2 and about 3 in the reduction end solution, and separating and recovering nickel powder product from said reduction end solution.

2. The process according to claim 1 wherein a plurality of successive slurry forming, slurry adjustment and reduction operations are conducted and at least a portion of the reduction-end solution from each nickel reduction operation is recycled and slurried with basic carbonates in the next following slurry make-up operation.

3. The process according to claim 2 wherein reduction end solution recycled to the slurry forming operation is first reacted with a sulphidizing agent to precipitate substantially all nickel and cobalt therefrom as a mixed sulphide having a nickel to cobalt molar ratio between about 1:1 and about 0.5:1.

4. The process according to claim 2 wherein the reduction feed slurry concentration and the quantity of reduction end solution recycled are adjusted so as to maintain an equilibrium level of ammonium sulphate in the reduction feed slurry within the range of 40–50 g.p.l.

5. The process according to claim 2 wherein substantially all the nickel powder product produced in each reduction operation is retained in the reduction vessel until up to about 50 reduction operations have been completed whereby said powder is gradually densified by the deposition thereon of precipitated elemental nickel.

6. The process according to claim 1 wherein the liquor from the cobalt removal operation is reacted with a free-oxygen containing gas at elevated temperature and pressure to convert substantially all sulphur therein to sulphate form.

7. The process according to claim 1 wherein the aqueous reduction feed slurry of basic carbonates is reacted with a free-oxygen containing gas at elevated temperature and pressure to convert substantially all sulphur therein to sulphate form.

8. The process according to claim 1 wherein the sulphate ion content of the reduction feed slurry is adjusted by the addition of sulphuric acid.

9. The process according to claim 2 wherein the aqueous reduction feed slurry contains chloride and magnesium ions and at least a portion of the reduction end solution is bled from the system to prevent the build-up of said ions in the solution recycled to the slurry forming operation.

10. The process according to claim 1 wherein the nickel content of said reduction feed slurry is between about 40 and about 150 g.p.l.

References Cited
UNITED STATES PATENTS

| | | | |
|---|---|---|---|
| 2,711,958 | 6/1955 | Schaufelberger et al. | 75—119 |
| 3,640,706 | 2/1972 | Zubryckyj et al. | 75—119 X |
| 3,141,765 | 7/1964 | Brown et al. | 75—119 X |
| 3,674,465 | 7/1972 | Evans et al. | 75—108 |

FOREIGN PATENTS

| | | | |
|---|---|---|---|
| 854,116 | 10/1970 | Canada | 75—119 |
| 811,078 | 4/1969 | Canada | 75—119 |
| 811,079 | 4/1969 | Canada | 75—119 |

HERBERT T. CARTER, Primary Examiner

U.S. Cl. X.R.

75—0.5 A, 103, 119